(No Model.) 2 Sheets—Sheet 2.
F. W. LEVERING.
SUPPORT FOR SHAVING MIRRORS.
No. 340,968. Patented Apr. 27, 1886.
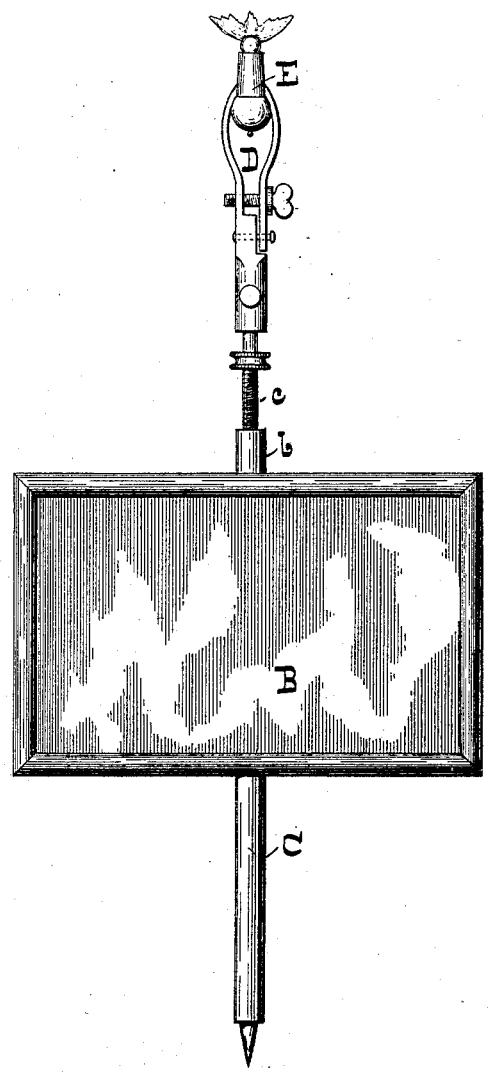
-FIG IV-
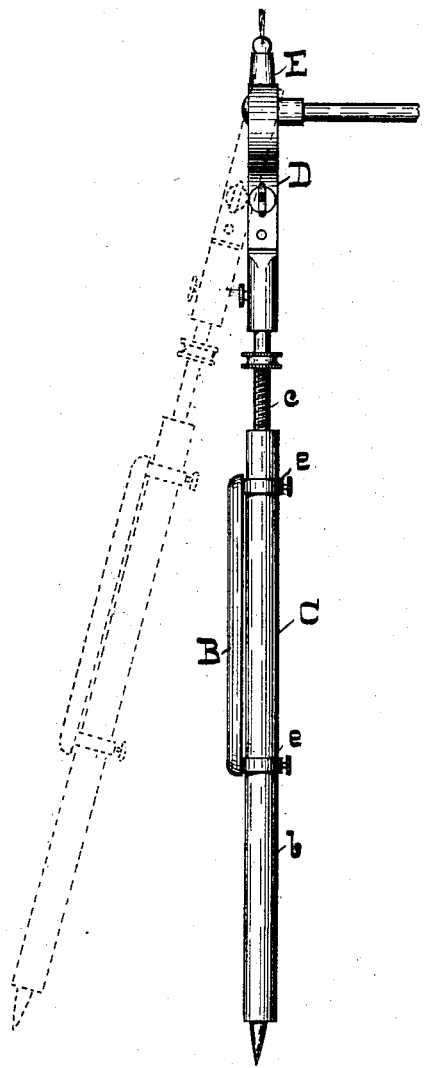
-FIG V-
WITNESSES
Dan'l Fisher
C. E. Grant
INVENTOR
Franklin W. Levering
by G. H. & W. T. Howard,
Attys.

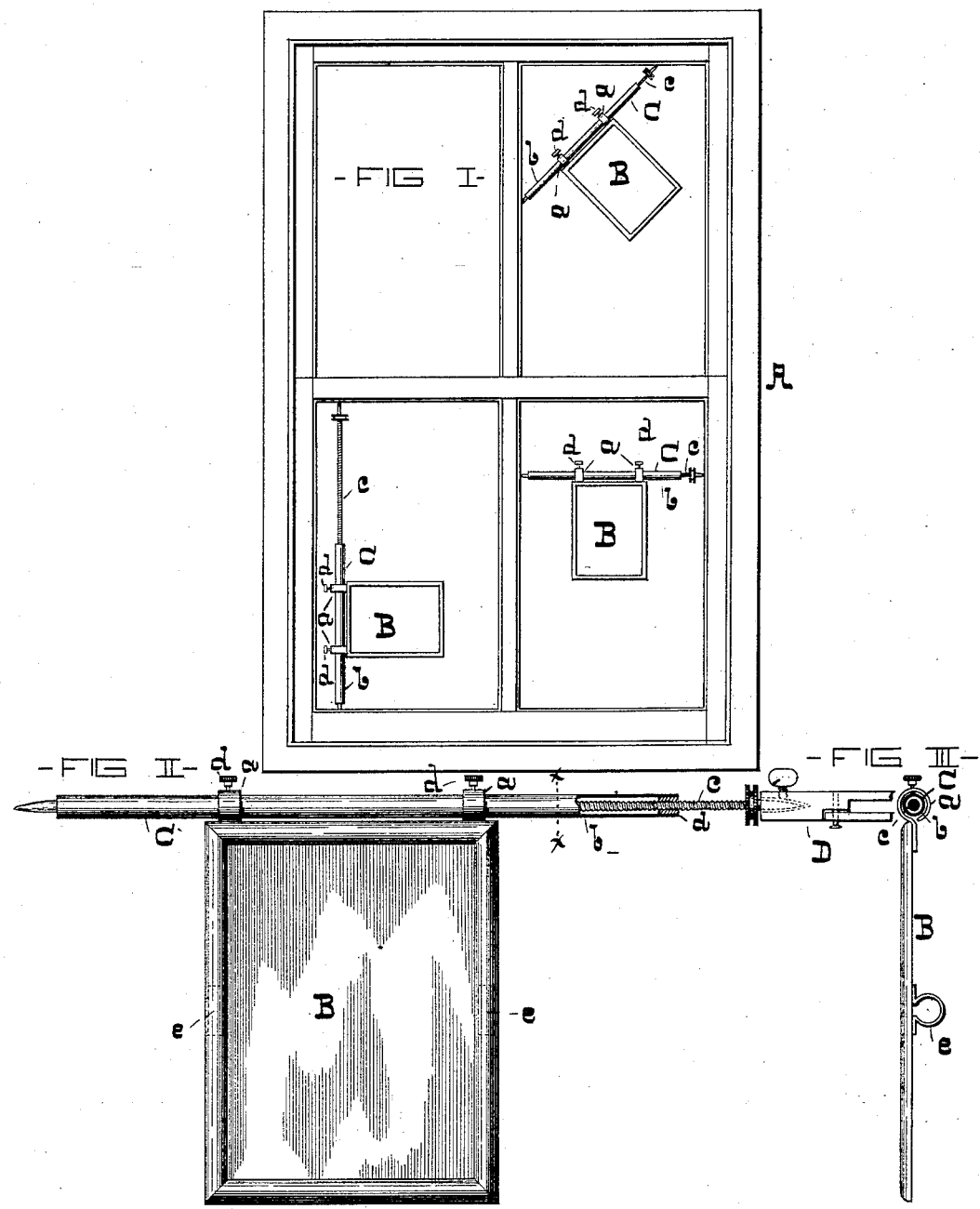

UNITED STATES PATENT OFFICE.

FRANKLIN W. LEVERING, OF BALTIMORE, MARYLAND.

SUPPORT FOR SHAVING-MIRRORS.

SPECIFICATION forming part of Letters Patent No. 340,968, dated April 27, 1886.

Application filed January 28, 1886. Serial No. 190,027. (No model.)

*To all whom it may concern:*

Be it known that I, FRANKLIN W. LEVERING, of the city of Baltimore and State of Maryland, have invented certain Improvements in Supports for Shaving-Mirrors, of which the following is a specification.

It is well known that during daylight the best place for a shaving-mirror is in the front of a window, as the light entering the window then illuminates the face, and the illuminated figure is reflected in the glass. In gas-light the mirror should be so placed that the light falls on the face rather than on the glass. Consequently an angular position immediately below the gas-light is found to be the proper one.

My invention, therefore, consists in a mirror specially adapted for attachment to a window-frame, and in such position that it will not interfere with the movement of the sash in opening and closing the window.

It further consists in providing the said mirror with devices whereby it may also be applied to a gas-burner, and in an angular position with reference thereto.

In the drawings forming a part hereof, Figure I is a front view of a window, to three panes of which are applied mirrors after the manner of my invention. Fig. II is a front view, partly in section, of the mirror with its attachments on an enlarged scale. Fig. III is a section taken on the dotted line $x\,x$, Fig. II. Figs. IV and V are views showing the mirror attached to a gas-burner.

In the said drawings, A is a window-frame of ordinary description, to three panes of which are applied the mirror, which is represented by B. The mirror proper embodies no novel features; but it is provided with eyes $a\,a$, through which are inserted the supporting-bar C. This bar is extensible in length, and with this view it is preferably formed in two parts, $b\,c$, as shown, the part $c$ being threaded, and adapted to turn in a nut, $d$. The eyes $a\,a$ are provided with set-screws $d\,d$, to prevent the mirror from swinging on the rod C or sliding longitudinally thereof when the rod is placed in a vertical or an inclined position.

The ends of the bar C are pointed, preferably as illustrated, in order that the said bar with its attachments can be secured within the sash, as shown.

To admit of the mirror being applied to a gas-fixture, one end of the bar C is fitted with a removable clamp or vise, D, to hold the bar C to the burner E, as shown in Fig. IV, and allow the mirror being placed at an angle with reference to a vertical line. When this latter arrangement is employed, the bar C is passed through eyes $e\,e$, which are situated centrally of the mirror, as shown in dotted lines in Fig. II.

I am aware that various articles have been supported between two objects by means of extensible bars, and that mirrors have been provided with eyes, through which a sustaining-bar is passed, and movement of the mirror longitudinally of the said bar prevented by means of collars and set-screws in the collars; but I am not aware that prior to my invention a mirror has been provided with eyes, through which a double-pointed extensible bar is inserted, and all swinging movement of the said mirror independently of the bar prevented by means of set-screws, as shown and described.

I therefore claim as my invention—

1. In combination with the mirror B, having the eyes $a\,a$, the extensible bar C, formed of the two parts $b$ and $c$, the outer ends of which are pointed, and set-screws $d$, to secure the said bar within the said eye, substantially as specified.

2. In combination with the mirror B, having the extensible supporting-bar C, the clamp D, having a socket therein adapted to fit over the end of the said bar, and a set-screw to hold it in place, substantially as and for the purpose specified.

FRANKLIN W. LEVERING.

Witnesses:
WM. T. HOWARD,
DANL. FISHER.